US012811778B2

(12) United States Patent
Stapleton et al.

(10) Patent No.: US 12,811,778 B2
(45) Date of Patent: Nov. 24, 2026

(54) EXTENSIBLE KEY MANAGEMENT (XKM)

(71) Applicant: Wells Fargo Bank, N.A., San Francisco, CA (US)

(72) Inventors: Jeffrey J. Stapleton, O'Fallon, MO (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 213 days.

(21) Appl. No.: 18/535,063

(22) Filed: Dec. 11, 2023

(65) Prior Publication Data

US 2025/0192989 A1 Jun. 12, 2025

(51) Int. Cl.
*H04L 9/08* (2006.01)
*H04L 9/32* (2006.01)

(52) U.S. Cl.
CPC .......... *H04L 9/0825* (2013.01); *H04L 9/0822* (2013.01); *H04L 9/3242* (2013.01)

(58) Field of Classification Search
CPC .... H04L 9/0825; H04L 9/0822; H04L 9/3242
USPC .......... 713/171
See application file for complete search history.

(56) References Cited

U.S. PATENT DOCUMENTS

| | | | | |
|---|---|---|---|---|
| 10,615,969 | B1 * | 4/2020 | Griffin | H04L 9/0897 |
| 10,615,970 | B1 * | 4/2020 | Griffin | H04L 9/0822 |
| 2018/0152305 | A1 * | 5/2018 | Jacquin | H04L 9/3263 |
| 2021/0029096 | A1 * | 1/2021 | Hart | H04L 9/0869 |

* cited by examiner

*Primary Examiner* — Moeen Khan
(74) *Attorney, Agent, or Firm* — Foley & Lardner LLP

(57) ABSTRACT

The arrangements disclosed herein relate to systems, apparatus, methods, and non-transitory computer readable media for recovering a first key by decrypting encrypted key using a master key, determining a first seed using the first key and a first Identifier (ID) identifying a first device, determining a second seed using the first key and a second ID identifying a second device; and distributing the first seed and the second seed to each of the first device or the second device. Each of the first device or the second device generates a data key using a key derivation function based on the first seed and the second seed. Each of the first device or the second device encrypts or decrypts data using the data key.

12 Claims, 4 Drawing Sheets

100

EXTENSIBLE KEY MANAGEMENT (XKM)

BACKGROUND

Key Management Protocols such as Transport Layer Security (TLS), Key Management Interoperability Protocol (KMIP), and Faux Key require a Hardware Security Module to export a key from its cryptographic boundary, which is disallowed. The alternative is to perform key management in software without using an HSM, which increases the risk of key compromise, weakens the overall cryptographic strength, and is poor cybersecurity practice.

SUMMARY

The arrangements disclosed herein relate to systems, methods, non-transitory computer-readable media, and apparatuses for recovering a first key by decrypting encrypted key using a master key, determining a first seed using the first key and a first Identifier (ID) identifying a first device, determining a second seed using the first key and a second ID identifying a second device; and distributing the first seed and the second seed to each of the first device or the second device. Each of the first device or the second device generates a data key using a key derivation function based on the first seed and the second seed. Each of the first device or the second device encrypts or decrypts data using the data key.

The arrangements disclosed herein relate to systems, methods, non-transitory computer-readable media, and apparatuses for sending a first Identifier (ID) identifying the first device and an encrypted key to an Extensible Key Management (XKM) device, receiving a first seed and a second seed, the first seed is generated using a first key and the first ID, and the second seed is generated using the first key and a second ID identifying a second device, generating a data key using a key derivation function based on the first seed and the second seed, and encrypting or decrypting data using the data key.

These and other features, together with the organization and manner of operation thereof, will become apparent from the following detailed description when taken in conjunction with the accompanying drawings.

DETAILED DESCRIPTION

The arrangements disclosed herein are directed to systems, apparatuses, methods, and non-transitory computer-readable media for an Extensible Key Management (XKM) scheme to establish cryptographic keys (e.g., symmetric keys) between two or more parties. In some arrangements, each party is provided an encrypted key and a unique identifier. An XKM service (e.g., an XKM system) returns one or more seeds for each party to derive a shared key. The shared key is unknown by the XKM service. Although none of the parties stores the shared key, and the shared key is manageable by any of the authorized parties at any time.

In some examples, Database Encryption Key Management (DBEKM) can be used in the XKM schemes to establish the cryptographic keys between the two or more parties. Examples of DBEKM are described in U.S. Pat. No. 10,615,969, titled "Database Encryption Key Management," filed Nov. 14, 2017, U.S. Pat. No. 11,095,438, titled "Database Encryption Key Management," filed Apr. 6, 2020, U.S. Pat. No. 11,683,158, titled "Database Encryption Key Management," filed Aug. 9, 2021, and U.S. Patent Publication No. 2023/0283456, titled "Database Encryption Key Management," filed Sep. 7, 2023, the entire contents of which are incorporated herein by reference in their entireties.

In some examples, an XKM scheme employs a Master Key (MK) used to encrypt another cryptographic key (referred to as HK), a Hash-Based Message Authentication Code (HMAC) key (e.g., HK) used to derive one or more seed values, and a data encryption key or Data Key (DK) used to encrypt and decrypt data, signals, messages, and information. In some examples, the MK is managed and only known by the XKM system. In some examples, the HK is unknown and encrypted using the MK, and the encrypted key MK(HK) is managed by each party. In some examples, the DK is managed by each party and unknown to the XKM system.

Figure 1:
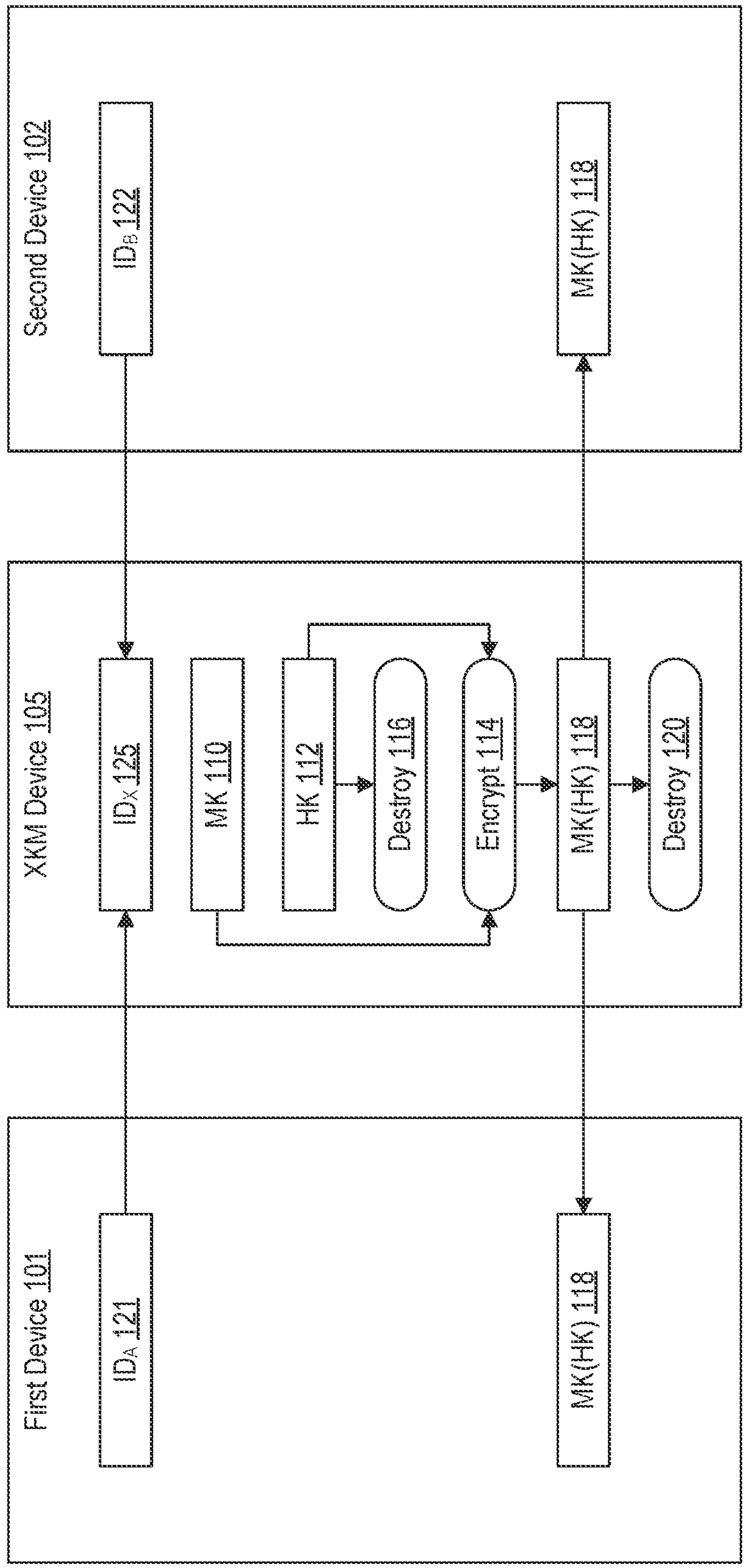
FIG. 1 is a diagram illustrating an example method for initializing XKM, according to various arrangements.

FIG. 1 is a diagram illustrating an example method 100 for initializing XKM, according to various arrangements. The method 100 can be performed using a first device 101, a second device 102, and an XKM device 105. The first device 101 can also be referred to as a first participant, a first user device, a first party, and so on. The second device 102 can also be referred to as a second participant, a second user device, a second party, and so on. The first device 101 and the second device 102 can participate in communications, including sending or receiving data, signals, messages, and information via a network or channel for which a cryptographic key (e.g., a symmetric key) needs to be established or derived.

The XKM device 105 initializes the XKM by generating a MK 110 and generating an HK 112. At 114, the HK 112 is encrypted using the MK 110 to generate the encrypted key MK(HK) 118. The XKM device 105 distributes the encrypted key MK(HK) 118 to the first device 101 and the second device 102 via at least one suitable network. In response to encrypting the MK 110 at 114 or in response to distributing the encrypted key MK(HK) 118, the HK 112 is destroyed at 116. In response to distributing the encrypted key MK(HK) 118, the MK(HK) 118 is destroyed at 120. Accordingly, each of the first device 101 and the second device 102 respectively manages the MK(HK) 118.

In some arrangements, both the first device 101 and the second device 102 are distributed the same encrypted key MK(HK) 118. In other arrangements, the HKs 112 generated for the first device 101 and the second device 102 can be different, e.g., HKA is generated for the first device 101 and HKB is generated for the second device 102. The XKM device 105 generates MK(HKA) for the first device 101 at 114 and distributes MK(HKA) to the first device 101. The XKM device 105 generates MK(HKB) for the second device 102 at 114 and distributes MK(HKB) to the second device 102. Accordingly, each of the first device 101 and the second device 102 respectively manages the MK(HKA) and MK(HKB). The MK(HKA) and MK(HKB) for the respective devices 101 and 102 can be collectively or generally referred to as MK(HK).

In some arrangements, the first device 101 and the second device 102 use the same HK 112. In some arrangements, the first device 101 has a first ID $ID_A$ 121, and the second device 102 has a second ID $ID_B$ 122, and the IDs 121 and 122 are different. In some examples, the first device 101 registers its ID 121 with the XKM device 105 before receiving the MK(HK) 118. That is, the XKM device 105 receives the ID 121 from the first device 101 before distributing the MK(HK) 118 to the first device 101. In some examples, the second device 102 registers its ID 122 with the XKM device 105 before receiving the MK(HK) 118. That is, the XKM device 105 receives the ID 122 from the second device 102 before distributing the MK(HK) 118 to the second device 102. The XKM device 105 can receive the IDs (represented by $ID_X$ 125) of multiple devices including the first device 101 and the second device 102.

Figure 2:
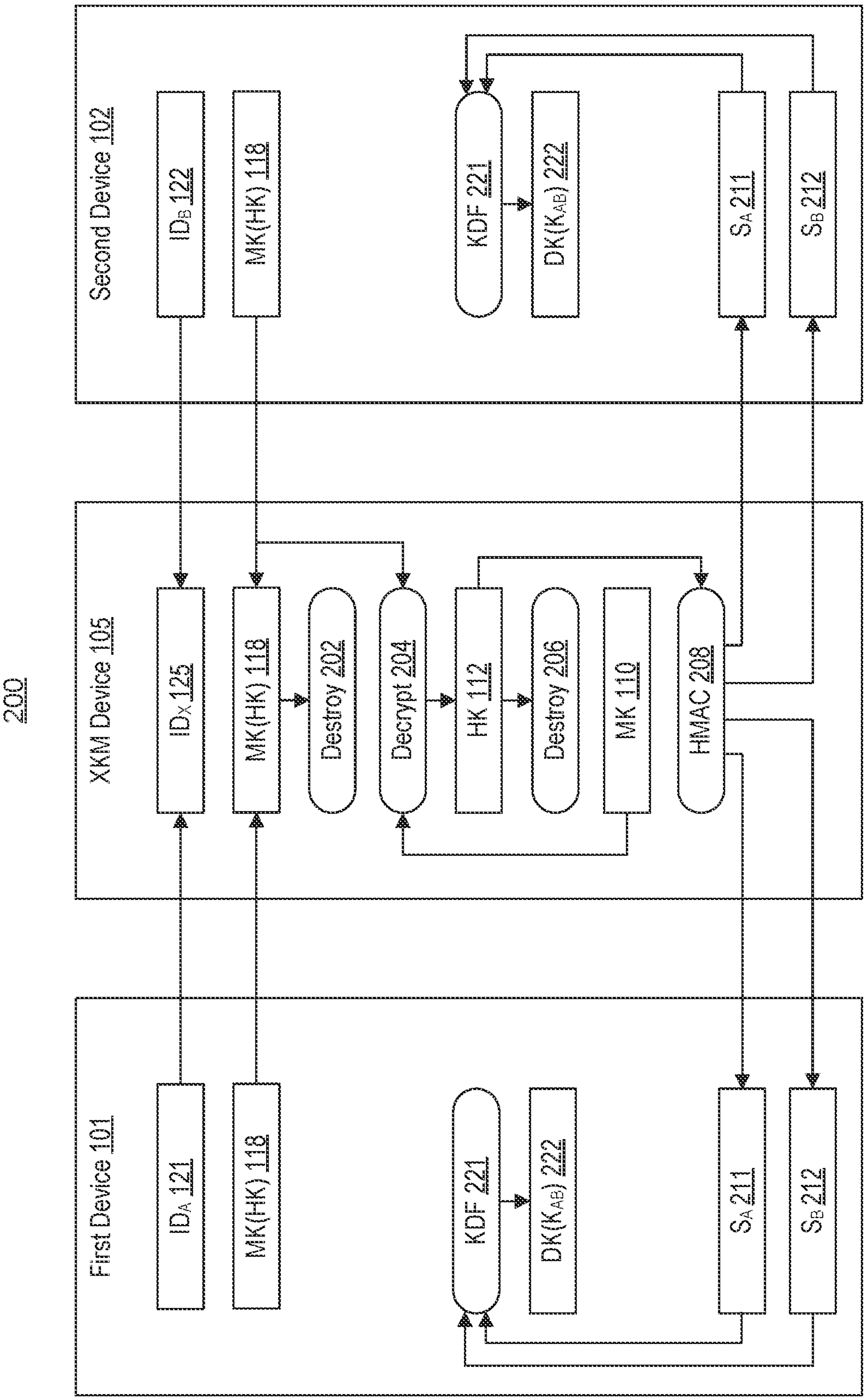
FIG. 2 is a diagram illustrating an example method for distributing seeds in XKM, according to various arrangements.

FIG. 2 is a diagram illustrating an example method 200 for distributing seeds in XKM, according to various arrangements. The method 200 can be performed using the first device 101, the second device 102, and the XKM device 105. In the method 200, the XKM device 105 provisions a seed to any authorized party (e.g., the first device 101, the second device 102, or another authorized device). Examples of the seed includes seed $S_A$ 211 and seed $S_B$ 212.

For example, the XKM device 105 can receive the MK(HK) 118 from the authorized party device, such as one or more of the first device 101 and the second device 102. In some arrangements, the first device 101 has a first ID $ID_A$ 121, and the second device 102 has a second ID $ID_B$ 122, and the IDs 121 and 122 are different and are used to identify the first device 101 and the second device 102. The first device 101 sends $ID_A$ 121 and MK(HK) 118 to the XKM device 105. The second device 102 sends $ID_B$ 122 and MK(HK) 118 to the XKM device 105. The XKM device 105 can receive the IDs (represented by $ID_X$ 125) of multiple devices including the first device 101 and the second device 102. At 204, the XKM device 105 can decrypt the received MK(HK) 118 using the MK 110 to recover the HK 112. In response to decrypting the MK(HK) 118 at 204, in response to generating the seeds 211 and 212, or in response to distributing the seeds 211 and 212, the MK(HK) 118 is destroyed at 202.

The XKM device 105 can generate a seed (e.g., $S_A$ for the first device 101, $S_B$ for the second device 102) using the IDs (e.g., $ID_A$ 121, $ID_B$ 122) and the recovered HK 112. The XKM device 105 then sends the seed to the authorized party. In some examples, the XKM device 105 can generate a first seed (e.g., $S_A$) 211 using $ID_A$ 121 and HK 112, and sends the first seed 211 to at least one of the first device 101 or the second device 102. In some examples, the XKM device 105 can generate a second seed (e.g., $S_B$) 212 using $ID_B$ 122 and HK 112, and sends the second seed 212 to at least one of the first device 101 or the second device 102. The XKM device 105 can use the HMAC function (HMAC 208) to generate the seeds 211 and 212. In some examples, the first seed $S_A$ 211 can be generated as HMAC (HK, $ID_A$), and the second seed $S_B$ 212 can be generated as HMAC (HK, $ID_B$).

In response to generating the seeds 211 and 212 or in response to distributing the seeds 211 and 212, the recovered HK 112 is destroyed at 206. In response to distributing the seeds 211 and 212, the seeds 211 and 212 are destroyed by the XKM device 105.

In some arrangements, the XKM device 105 provisions a DK for each of the first device 101 and the second device 102 by distributing the seeds 211 and 212. For example, each of the first device 101 or the second device 102 receives the seeds 211 and 212 from the XKM device 105 and derives the DK using the seeds 211 and 212 with a Key Derivation Function (KDF). For example, the first device 101 can input the seeds 211 and 212 (e.g., both seeds 211 and 212) into the KDF 221 to determine a DK referred to as DK($K_{AB}$) 222. For example, the second device 102 can input the seeds 211 and 212 (e.g., both seeds 211 and 212) into the KDF 221 to determine a same DK referred to as DK($K_{AB}$) 222.

In response to deriving the seed, the first device 101 or the second device 102 destroys any seeds 211 and 212 received. In some arrangements, at any time, if a party (e.g., the first device 101 or the second device 102) needs to reestablish its DK (e.g., the DK($K_{AB}$) 222), that party can initiate provisioning a seed by sending the MK(HK) 118) and its ID 121 or 122.

In some arrangements, the XKM device 105 provisions a shared DK (e.g., DK($K_{AB}$) 222) by sending multiple seeds (e.g., the seeds 211 and 212) to each party (e.g., the first and second devices 101 and 102). In some arrangements, the XKM device 105 provisions a shared DK (e.g., DK($K_{AB}$) 222) by sending a composite seed to each party. In some examples, instead of distributing the seeds 211 and 212 individually, the XKM device 105 can determine a composite seed using the seeds 211 and 212, where the composite seed can be determined by an XOR operation such as $S=S_A \oplus S_B$. Each party derives the shared DK using the multiple seeds or the composite seed with a KDF and destroys the multiple seeds or the composite seed in response to deriving the shared DK. In the examples in which a composite seed is provided to each of the first device 101 and the second device 102, the first device 101 can input the composite seed into the KDF 221 to determine a DK referred to as DK($K_{AB}$) 222, and the second device 102 can input the composite seed into the KDF 221 to determine a same DK referred to as DK($K_{AB}$) 222.

Although the first device 101 and the second device 102 are shown in FIGS. 1 and 2, the XKM device 105 can support as many parties as there are unique IDs within a domain of these parties. Each party or each device can have its own HK, or two or more parties or devices within a group can share the same HK. Whether the parties share the HK can be provided as a registration option for each party. The XKM device 105 can select the correct HK using a mapping table that maps the IDs of devices to the corresponding HKs, in the examples in which two or more devices have different HKs.

In some examples, the XKM device 105 can determine a composite seed generated using multiple seeds to be sent to one or more of the parties, instead of sending those multiple seeds. Whether the parties receive multiple seeds or a composite seed can be provided as a registration option for each party. In an example in which there are N parties or devices (e.g., A, B, . . . , N), a composite seed can be generated using one of:

$$HMAC(HK, ID_A) \mid HMAC(HK, ID_B) \mid \ldots \mid HMAC(HK, ID_N); \tag{1}$$

$$HMAC(HK, ID_A) \oplus HMAC(HK, IB_B) \oplus \ldots \oplus HMAX(HK, ID_N); \text{ or} \tag{2}$$

$$HMAC(HK, ID_A \mid ID_B \mid \ldots \mid ID_N). \tag{3}$$

For example, in expression (1), the composite seed is a combination of seeds each determined using a respective ID of the party or device and the HK (which can be the same or different as described), where the combination includes inclusive OR. In expression (2), the composite seed is a combination of seeds each determined using a respective ID of the party or device and the HK (which can be the same or different as described), where the combination includes exclusive OR. In expression (3), the composite seed is determined by applying the HK and a value determined using the IDs of the parties or devices as inputs into an HMAC function.

In some arrangements, the XKM device 105 destroys and does not store the HK 112, the MK(HK) 118, and the seeds 211 and 212 after they are used or provisioned. The XKM device 105 does not have access to the KDF 221 of the devices 101 and 102, to preclude the XKM device 105 from deriving the DKs 222 of the devices 101 and 102, thus improving security of the provisioning methods. In some examples, the XKM device 105 employs or includes a Hardware Security Module (HSM) such as a FIPS 140-3 security level 3 or higher to protect the MK 110. In some examples, the XKM device 105 is part of or within the HSM security boundary HSM.

Figure 3:
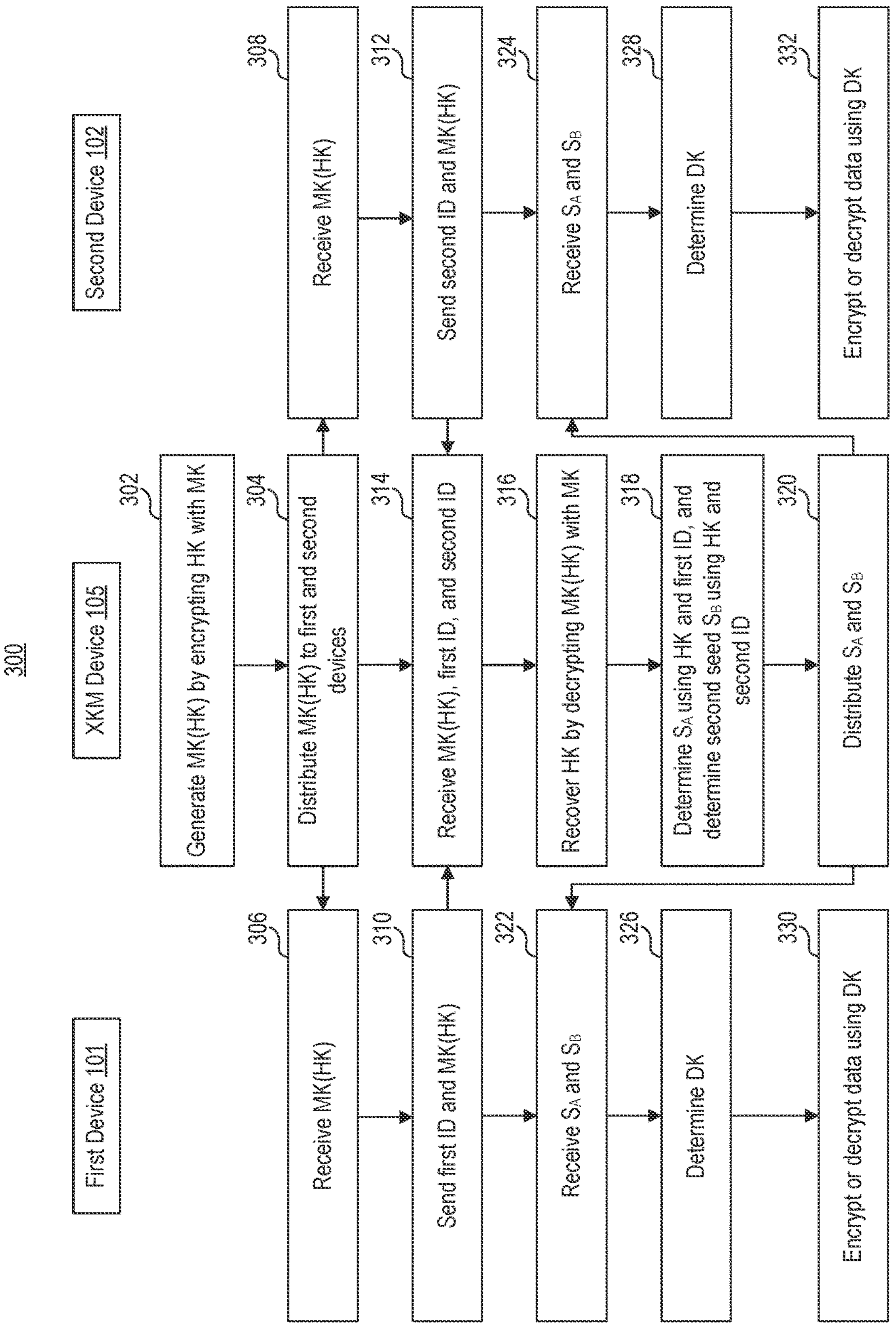
FIG. 3 is a flowchart diagram illustrating an example XKM method, according to various arrangements.

FIG. 3 is a flowchart diagram illustrating an example XKM method 300, according to various arrangements. The method 300 can be performed by the first device 101, the second device 102, and the XKM device 105. The first device 101 performs blocks 306, 310, 322, 326, and 330. The second device 102 performs blocks 308, 312, 324, 328, and 332. The XKM device 105 performs blocks 302, 304, 314, 316, 318, and 320. The methods 100 and 200 are particular implementations of the method 300.

Communications among the first device 101, the second device 102, and the XKM 105 can be performed via a suitable network. The network is any suitable Local Area Network (LAN), Wide Area Network (WAN), or a combination thereof. For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network is structured to permit the exchange of data, values, parameters, signals, instructions, messages, and the like. In some arrangements, the communications be among the first device 101, the second device 102, and the XKM 105 can be performed over one or more secure connections, such as Transport Layer Security (TLS) or Secure Shell (SSH).

At 302, the XKM device 105 generates an encrypted key MK(HK) 118 by encrypting a first key (e.g., HK 112) with the MK 110, for example, at 114. At 304, the XKM device 105 distributes MK(HK) 118 to the first device 110 and the second device 102 via the network. At 306, the first device 101 receives MK(HK) 118 via the network. At 308, the second device 102 receives MK(HK) 118 via the network. The HK 112 and the MK(HK) 118 are destroyed after being used. The XKM is accordingly initialized.

In response to at least one of the first device 101 or the second device 102 determining that a key such as a DK is needed, the at least one of the first device 101 or the second device 102 sends its respective ID and MK(HK) 118 to the XKM device 105 to trigger provisioning of the DK or to trigger provisioning of seeds used by the at least one of the first device 101 or the second device 102 to generate the DK. For example, at 310, the first device 101 sends a first ID (e.g., $ID_A$ 121) and MK(HK) 118 via the network to the XKM device 105. At 312, the second device 102 sends a second ID (e.g., $ID_B$ 122) and MK(HK) 118 via the network to the XKM device 105. At 314, the XKM device 105 receives via the network the MK(HK) 118 from both the first and second devices 101 and 102, receives via the network the first ID from the first device 101, and receives via the network the second ID from the second device 102.

At 316, the XKM device 105 recovers the first key (e.g., HK 112) by decrypting the encrypted key (MK(HK) 118) using the MK 110, e.g., at 204. For example, the HK 112 can be encrypted using the MK 110, which is a Key Encryption Key (KEK). At 318, the XKM device 105 determines a first seed $S_A$ 211 using the HK 112 and the first ID and determines a second seed $S_B$ 212 using the HK 112 and the second ID, for example, at 208. The first ID identifies the first device 101. The second ID identifies the second device 102. For example, determining the first seed includes generating the first seed by inputting the first key and the first ID into an HMAC function (e.g., the HMAC 208). For example, determining the second seed includes generating the second seed by inputting the first key and the second ID into the HMAC function.

At 320, the XKM device 105 distributes the first seed $S_A$ 211 and the second seed $S_B$ 212 to the first device 110 and the second device 102 via the network. At 322, the first device 101 receives the first seed $S_A$ 211 and the second seed $S_B$ 212 via the network. At 324, the second device 102 receives the first seed $S_A$ 211 and the second seed $S_B$ 212 via the network. The HK 112, the MK(HK) 118, and any generated seeds are destroyed after being used.

In some arrangements, both the first seed and the second seed are distributed to each of the first device 101 or the second device 102, such that KDF $(S_A+S_B)$=DK=KDF $(S_B+S_A)$. Each of the first device 101 or the second device 102 generates the DK using the KDF by applying both the first seed $S_A$ 211 or the second seed $S_B$ 212 as inputs into the KDF.

In some arrangements, instead of the first and second seeds 211 and 212 individually, a combined seed can be distributed in the manner described, e.g., using expressions (1), (2), and (3). For example, the XKM device 105 generates a composite seed by combining the first seed and the second seed. The XKM device 105 distributes the composite seed to each of the first device 101 or the second device 102. Of the first device 101 or the second device 102 generates the DK using the KDF by applying the composite seed as input into the KDF.

At 326, the first device 101 determines the DK. For example, the first device 101 can input the first seed $S_A$ 211 and the second seed $S_B$ 212 into the KDF 221 to derive the DK (e.g., the DK($K_{AB}$) 222). At 330, the first device 101 can encrypt or decrypt data using the DK. At 328, the second device 101 determines the DK. For example, the second device 102 can input the first seed $S_A$ 211 and the second seed $S_B$ 212 into the KDF 221 to derive the DK (e.g., the DK($K_{AB}$) 222). At 332, the first device 101 can encrypt or decrypt data using the DK. In some examples, the data encrypted or decrypted at 330 and 332 can include sensitive data such as a name, address, phone number, email address, payment information, payment number, Personal Identification Number (PIN), Personally Identifiable Information (PII), social security number, and so on. In some examples, the data encrypted or decrypted at 330 and 332 can include cryptographic keys, cryptographic materials used to generate cryptographic keys, secrets, and so on. In some examples, the DK can be used by one or more of the first device 101 and the second device 102 to establish a session key or integrity key in a TLS handshake. In some examples, the DK can be used to sign or verify signed data. In some examples, the DK can be used to signcrypt or verify the signcrypted data.

In the methods 100, 200, and 300, the HKs are never stored or retained by the devices 101, 102, or 105. The devices 101 and 102 store the encrypted key MK(HK) and not the HK itself. The devices 101 and 102 never store the DKs after the DKs are used. DKs are always derived from the seed provisioned by the XKM device 105. If a device or party requires DK (e.g., for encryption, decryption, sign, signcrypt, and so on), the device or party can request the seed by sending the ID of the device and MK(HK) to obtain the seed. The seeds are never stored or retained by the devices 101, 102, or 105 and are instead fetched from the XKM device 105 after being generated. Seeds are generated by the XKM device 105 using one or more HK and the ID of the device or party. KDFs are only known to the parties and unknown to the XKM service, thus providing isolation. Only the parties can derive the DK from the seeds, the XKM system 105 cannot derive the DK. Only the XKM system 105 can generate the seeds, and the parties cannot generate seeds. There is no cleartext cryptographic keys are exported from the HSM that use the XKM system, consistent with standards, protocols, and best practices.

The methods 100, 200, and 300 can be used to establish symmetric keys (e.g., the DK($K_{AB}$) 222) with multiple parties or devices 101 and 102 within the same group. The methods 100, 200, and 300 can be used to establish between groups, where the first device 101 belongs to a first group and the second device 102 belongs to a second group.

In some examples, methods 100, 200, and 300 can be used to regenerate asymmetric keys (e.g., in establishing pseudo-random numbers for generating prime numbers and other Critical Security Parameter (CSP) to generate asymmetric keys). That is, the seeds provided by the XKM device 105 can be used as a pseudo entropy source to regenerate asymmetric keys by the first device 101 and the second device 102. The seeds provided by the XKM device 105 to the devices 101 and 102 can be different (e.g., using different HKs 112, using different HMACs 208, using different methods for combining two or more seeds or IDs, and so on).

Figure 4:
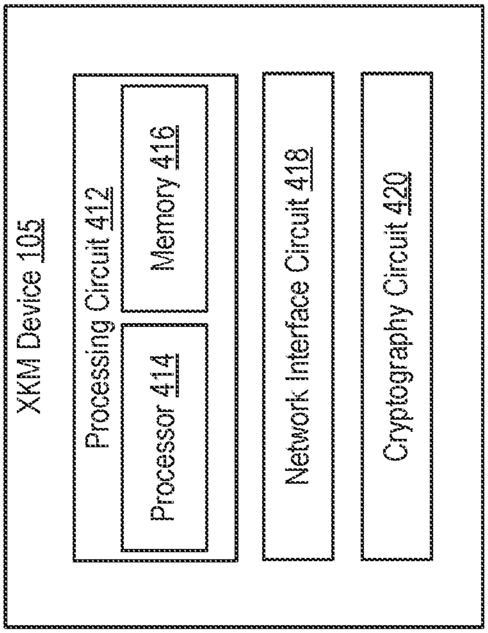
FIG. 4 is a block diagram of an example XKM device, according to some arrangements.

FIG. 4 is a block diagram of an example XKM device 105, according to some arrangements. The XKM device 105 can include a suitable computing system such as a desktop computer, laptop computer, smart phone, tablet, server, and so on. In some examples, the XKM device can be implemented for or within an HSM. The XKM device 105 is shown to include various circuits and logic for implementing the operations described herein. More particularly, the XKM device 105 includes one or more of a processing circuit 412, a network interface circuit 418, and a cryptography circuit 420. While various circuits, interfaces, and logic with particular functionality are shown, it should be understood that the XKM device 105 includes any number of circuits, interfaces, and logic for facilitating the operations described herein. For example, the activities of multiple circuits are combined as a single circuit and implemented on a same processing circuit (e.g., the processing circuit 412), as additional circuits with additional functionality are included.

In some arrangements, the processing circuit 412 includes a processor 414 and a memory 416. The processor 414 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 416 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 416 is or includes tangible, non-transient volatile memory or non-volatile memory. Accordingly, the memory 416 includes database components, object code components, script components, or any other type of information structure for supporting the various activities and information structures described herein. The processing circuit 412 can be used to implemented one or more of the circuits 418 and 420.

The network interface circuit 418 is configured for and structured to establish a connection and communicate with the devices 101 and 102 via the network or another suitable wired, wireless, or physical connection. The network interface circuit 418 is structured for sending and receiving data over a communication network (e.g., the network 150) or a physical connection (e.g., via a physical connector such as Universal Serial Bus (USB)). Accordingly, the network interface circuit 418 includes any of a cellular transceiver (for cellular standards), wireless network transceiver (for 802.11X, ZigBee, Bluetooth, Wi-Fi, or the like), wired network interface, or a combination thereof. For example, the network interface circuit 418 may include wireless or wired network modems, ports, baseband processors, and associated software and firmware.

The cryptography circuit 420 can be implemented with the processing circuit 412 or a separate processing circuit similar to the processing circuit 412. In some examples, the cryptography circuit 420 can be or include an HSM, or an HSM is embedded, attached, or network-connected to the cryptography circuit 420 or the device 105. In some examples, the XKM device 105 can be or include an HSM. The cryptography circuit 420 is configured for and structured to perform the XKM-related methods and operations of the XKM device 105 described herein, including those relative to methods 100, 200, and 300. For example, the cryptography circuit 420 can be used to derive the MK 110 and the HK 112, perform encryption at 114 to obtain MK(HK) 118, and perform the destruction of the HK 112 at 116 and the MK(HK) 118 at 120. For example, the cryptography circuit 420 can be used to perform decryption at 204, perform the HMAC at 208, and perform destruction of the MK(HK) 118 at 202, the destruction of HK 112 at 206, and the destruction of the seeds after distribution.

Figure 5:
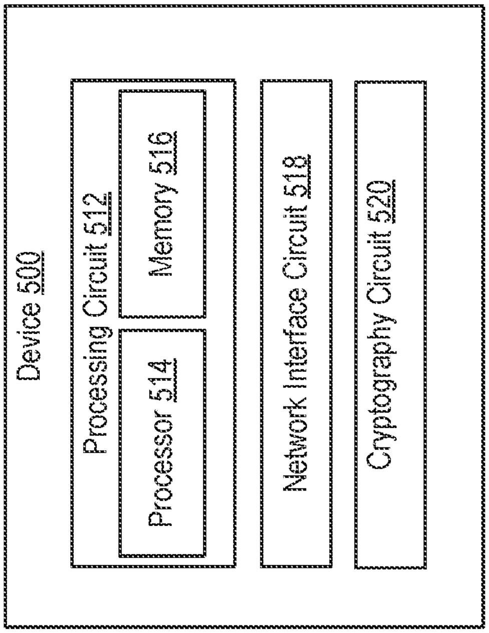
FIG. 5 is a block diagram of an example user device, according to some arrangements.

FIG. 5 is a block diagram of an example user device 500, according to some arrangements. The user device 500 can be each of a plurality of devices to which the XKM device 105 can distribute the MK(HK) and the seeds, in the manner described. For example, the user device 500 can include the devices 101 and 102. Examples of the user device 500 can include a mobile device, a smartphone, a laptop computer, a tablet, a desktop computer, a Point of Sale (POS) device, an Automatic Teller Machine (ATM), a kiosk, a customer interaction device, and the like. The user device 500 is shown to include various circuits and logic for implementing the operations described herein. More particularly, the computing system 500 includes one or more of a processing circuit 512, a network interface circuit 518, and a cryptography circuit 520. While various circuits, interfaces, and logic with particular functionality are shown, it should be understood that the computing system 500 includes any number of circuits, interfaces, and logic for facilitating the operations described herein. For example, the activities of multiple circuits are combined as a single circuit and implemented on a same processing circuit (e.g., the processing circuit 512), as additional circuits with additional functionality are included.

In some arrangements, the processing circuit 512 has a processor 514 and memory 516. The processor 514 is a processing component such as the processor 414. The memory 516 is a memory device such as the memory 416. The processing circuit 512 can be used to implemented one or more of the circuits 518 and 520.

The network interface circuit 518 is a network device such as the network interface circuit 518. The network interface circuit 518 is configured for and structured to establish a connection and communicate with the XKM device 105 via the network or another suitable wired, wireless, or physical connection.

The cryptography circuit 520 can be implemented with the processing circuit 512 or a separate processing circuit similar to the processing circuit 512. In some examples, the cryptography circuit 520 can be or include an HSM, or an HSM is embedded, attached, or network-connected to the cryptography circuit 520 or the device 500. In some examples, the device 500 can be or include an HSM. The cryptography circuit 520 is configured for and structured to perform the XKM-related methods and operations of the first device 101 or the second device 102 described herein, including those relative to methods 100, 200, and 300. For example, the cryptography circuit 520 can be used to send an ID of the user device 500 and the MK(HK) 118 to the XKM device 105. For example, the cryptography circuit 520 can be used to perform the KDF 221. For example, the cryptography circuit 520 can be used to encrypt, decrypt, sign, signcrypt data using the derived DK($K_{AB}$) 222. the cryptography circuit 520 can be used to perform the destruction of the seeds and the derived DK($K_{AB}$) 222.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A system, comprising:

at least one memory; and at least one processor of an extensible key management (XKM) device, the at least one processor configured to:

receive a first ID and an encrypted key from a first device;

receive a second ID and the encrypted key from a second device, wherein the first ID, the second ID, and the encrypted key are received in response to determining by the first device and the second device that a data key is to be provided for performing encryption or decryption operation, and wherein the first ID, the second ID, and the encrypted key trigger provisioning of seeds used by the first device and the second device to generate the data key;

recover a first key by decrypting the encrypted key using a master key;

determine a first seed using the first key and the first ID identifying the first device;

determine a second seed using the first key and the second ID identifying the second device;

generate, at the XKM device remote from the first device and the second device, a composite seed by combining the first seed and the second seed based on an XOR operation;

distribute, from the XKM device, the composite seed to each of the first device and the second device, wherein each of the first device and the second device generates a data key using a key derivation function based on the composite seed, wherein each of the first device and the second device encrypts or decrypts data using the data key, wherein the key derivation function used by the first device and the second device to generate the data key is inaccessible to the XKM device, and wherein the data key generated by the first device and the second device using the key derivation function based on the composite seed is used to establish a session key for a secure communication protocol;

destroy the first key in response to at least one of determining the first seed and the second seed or distributing the composite seed; and destroy the first seed and the second seed in response to distributing the composite seed.

2. The system of claim 1, wherein the first key comprises a Hash-Based Message Authentication Code (HMAC) key.

3. The system of claim 2, wherein the HMAC key is encrypted using the master key, the master key is a Key Encryption Key (KEK).

4. The system of claim 1, wherein the at least one processor is configured to:

destroy the encrypted key in response to at least one of decrypting the encrypted key, determining the first seed, determining the second seed, or distributing the first seed and the second seed.

5. The system of claim 1, wherein:

determining the first seed comprises generating the first seed by inputting the first key and the first ID into a Hash-Based Message Authentication Code (HMAC) function; and determining the second seed comprises generating the second seed by inputting the first key and the second ID into the HMAC function.

6. The system of claim 1, wherein the at least one processor is configured to:

generate the encrypted key by encrypting the first key using the master key; and distribute the encrypted key to the first device and the second device.

7. The system of claim 6, wherein the at least one processor is configured to:

destroy the first key in response to encrypting the first key using the master key or in response to distributing the encrypted key; and destroy the encrypted key in response to distributing the encrypted key.

8. The system of claim 1, wherein the at least one processor is configured to generate the composite seed by applying the first key and a value determined using the first ID and the second ID as inputs into a function.

9. A method, comprising:

receiving a first ID and an encrypted key from a first device;

receiving a second ID and the encrypted key from a second device, wherein the first ID, the second ID, and the encrypted key is received in response to determining by the first device and the second device that a data key is to be provided for performing encryption or decryption operation, and wherein the first ID, the second ID, and the encrypted key trigger provisioning of seeds used by the first device and the second device to generated the data key;

recovering a first key by decrypting the encrypted key using a master key;

determining a first seed using the first key and the first ID identifying the first device;

determining a second seed using the first key and the second ID identifying the second device;

generating, at an extensible key management (XKM) device remote from the first device and the second device, a composite seed by combining the first seed and the second seed based on an XOR operation;

distributing, from the XKM device, the composite seed to the first device and the second device, wherein each of the first device and the second device generates a data key using a key derivation function based on the composite seed, and wherein each of the first device and the second device encrypts or decrypts data using the data key, wherein the key derivation function used by the first device and the second device to generate the data key is inaccessible to the XKM device, and wherein the data key generated by the first device and the second device using the key derivation function based on the composite seed is used to establish a session key for a secure communication protocol;

destroying the first key in response to at least one of determining the first seed and the second seed or distributing the composite seed; and destroying the first seed and the second seed in response to distributing the composite seed.

10. The method of claim 9, wherein:

determining the first seed comprises generating the first seed by inputting the first key and the first ID into a Hash-Based Message Authentication Code (HMAC) function; and determining the second seed comprises generating the second seed by inputting the first key and the second ID into the HMAC function.

11. A non-transitory computer-readable medium (CRM) having instructions stored thereon, the instructions executable by at least one processor to:

receive a first ID and an encrypted key from a first device;

receive a second ID and the encrypted key from a second device, wherein the first ID, the second ID, and the encrypted key is received in response to determining by the first device and the second device that a data key is to be provided for performing encryption or decryption operation, and wherein the first ID, the second ID, and the encrypted key trigger provisioning of seeds used by the first device and the second device to generated the data key;

recovering a first key by decrypting the encrypted key using a master key;

determining a first seed using the first key and the first ID identifying the first device;

determining a second seed using the first key and the second ID identifying the second device;

generating, at an extensible key management (XKM) device remote from the first device and the second device, a composite seed by combining the first seed and the second seed based on an XOR operation;

distributing, from the XKM device, the composite seed to the first device and the second device, wherein each of the first device and the second device generates a data key using a key derivation function based on the composite seed, and wherein each of the first device and the second device encrypts or decrypts data using the data key, wherein the key derivation function used by the first device and the second device to generate the data key is inaccessible to the XKM device, and wherein the data key generated by the first device and the second device using the key derivation function based on the composite seed is used to establish a session key for a secure communication protocol;

destroying the first key in response to at least one of determining the first seed and the second seed or distributing the composite seed; and destroying the first seed and the second seed in response to distributing the composite seed.

12. The non-transitory CRM first device of claim 11, wherein the first key comprises a Hash-Based Message Authentication Code (HMAC) key.

* * * * *